United States Patent
Westmoreland et al.

(10) Patent No.: US 12,398,816 B2
(45) Date of Patent: Aug. 26, 2025

(54) CHEMICAL INJECTION OPTIMIZATION AND CONTROL VALVE DEVICE FOR DISPENSING AND OPTIMIZING CHEMICAL INJECTION PROCESSES

(71) Applicant: D & D DesignTech, Ltd., Snyder, TX (US)

(72) Inventors: Dennis Westmoreland, Snyder, TX (US); David Naizer, Snyder, TX (US)

(73) Assignee: D & D DesignTech, Ltd., Snyder, TX (US)

( * ) Notice: Subject to any disclaimer, the term of this patent is extended or adjusted under 35 U.S.C. 154(b) by 0 days.

(21) Appl. No.: 18/954,443

(22) Filed: Nov. 20, 2024

(65) Prior Publication Data

US 2025/0164022 A1 May 22, 2025

Related U.S. Application Data

(60) Provisional application No. 63/600,962, filed on Nov. 20, 2023.

(51) Int. Cl.
*F16K 15/06* (2006.01)
*E21B 34/00* (2006.01)
*F17D 3/12* (2006.01)

(52) U.S. Cl.
CPC ............ *F16K 15/066* (2013.01); *E21B 34/00* (2013.01); *F17D 3/12* (2013.01)

(58) Field of Classification Search
CPC ........... F16K 15/066; E21B 34/00; F17D 3/12
See application file for complete search history.

(56) References Cited

U.S. PATENT DOCUMENTS

| | | | | |
|---|---|---|---|---|
| 2,319,021 A | * | 5/1943 | Van Nest | F16K 15/063 137/535 |
| 3,255,774 A | * | 6/1966 | Gallagher | F16K 17/06 137/540 |
| 3,395,725 A | * | 8/1968 | Roach | F16K 15/044 188/289 |
| 5,626,325 A | * | 5/1997 | Buchanan | F02M 57/023 137/539.5 |
| 9,429,956 B1 | * | 8/2016 | Levy | F16K 15/00 |
| 2015/0020898 A1 | * | 1/2015 | Tseng | B01D 61/10 137/512 |
| 2017/0297041 A1 | * | 10/2017 | Delaney | B05B 1/3006 |

* cited by examiner

*Primary Examiner* — Patrick C Williams
(74) *Attorney, Agent, or Firm* — Sarah Hegi Simpson; Simpson Law

(57) ABSTRACT

A chemical injection optimization and control valve device for dispensing and optimizing chemical injection processes is disclosed. The disclosed device comprises an inlet port assembly having an inlet port in fluid communication with the shoulders of a piston, said piston comprising a conical point. The conical point of the piston is in physical contact with a discharge channel leading from the center of a seat body housing to a discharge port in the seat body housing. The piston is held in place by an adjustable tensioning mechanism by which the pressure required to depress the piston may be controlled. When the inlet pressure reaches a desired level, fluid flows past the piston into the discharge port and into the process stream. In the piston's closed position, desired inlet fluid pressure is retained and fluid cannot pass or siphon past the piston.

18 Claims, 4 Drawing Sheets

CHEMICAL INJECTION OPTIMIZATION AND CONTROL VALVE DEVICE FOR DISPENSING AND OPTIMIZING CHEMICAL INJECTION PROCESSES

CROSS-REFERENCE TO RELATED APPLICATIONS

This application is related to and claims priority from earlier filed U.S. Provisional Patent Application No. 63/600,962, filed Nov. 20, 2023, the disclosure of which is incorporated herein by reference.

BACKGROUND OF THE INVENTION

1. Field of the Invention

The present invention generally relates to a chemical injection optimization and control valve device that features anti-siphon valve functions, safety back flow check valve functions, and adjustable pressure control functions. In addition to oil and gas well chemical treatment applications, the disclosed device may be used for additional applications including municipal water applications and agricultural chemical treatment equipment applications.

2. Description of Related Art

Erratic chemical injection equipment performance and point of injection condition variations lead to inconsistent chemical injection rates and undesirable and unintentional siphoning of injection chemicals.

The disclosed invention relates to a device for dispensing and optimizing the injection of a controlled amount of chemical into a process stream or well. Oil and gas wells, pipelines, and other process streams rely on the injection of chemicals, including surfactants, corrosion inhibitors, antifreeze agents, and the like to enhance and maintain operation. Existing methods of injecting chemicals include direct injection using simple check valves inserted into the process stream or well, with the operation of the valve depending on the balance of the process discharge pressure, hydrostatic column pressure, and additional pressure exerted on the injected chemical. The downhole pressure in a well can vary widely, causing the hydrostatic column pressure to periodically exceed the downhole pressure. Injected chemical flows freely until the differential between the downhole pressure and the hydrostatic column pressure is sufficient to stem the flow of chemical from the chemical supply source. This scenario also occurs in process pipeline when an improper pressure imbalance occurs between the pipeline and chemical supply source. Free flow of chemicals, combined with inconsistent chemical injection associated with pumps and traditional simple check valves, leads to substantial waste of chemicals injected into process streams or wells. This wasted chemical is expensive and an excess of injected chemical can be harmful—many chemicals are highly corrosive and damaging to equipment when backflow occurs. A need exists for an apparatus configured with backflow safeguards that delivers a consistent measured quantity of chemical into a process stream or well notwithstanding fluctuating downstream pressures.

In view of the foregoing, it is apparent that a need exists in the art for a device for dispensing and optimizing chemical injection processes which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above-described drawbacks associated with current chemical injection processes and devices. To achieve these and other advantages and in accordance with the purpose of the invention, as embodied and broadly described, the present disclosure describes a chemical injection optimization and control valve device for dispensing and optimizing chemical injection processes.

The disclosed invention is designed to reduce the occurrence of unintentional siphoning due to changes in well and tubing conditions. The device includes a valve that is set to provide a consistent back pressure for a chemical pump to maintain a consistent output of the chemical pump. The integral check valve of the disclosed device provides an added safety feature by decreasing the likelihood of downhole pressures and fluids backing into the chemical pump.

The disclosed small and light weight device allows it to be installed in-line or directly on the outlet of a pump or filter. Furthermore, the device is multifunctional and includes anti-siphon valve functions, back pressure valve functions, and check valve functions, thereby eliminating the need for multiple devices on an injection line. The disclosed invention solves the problems discussed above by providing a chemical dispenser and optimizer device with integral backflow prevention capability, antisiphon capability, and adjustable opening pressure, which operates consistently regardless of process downstream pressure.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings:

FIG. 3 depicts an assembled view of a cartridge option.

DETAILED DESCRIPTION OF ILLUSTRATIVE EMBODIMENTS

Exemplary embodiments of a device for dispensing and optimizing chemical injection processes in accordance with the present disclosure are discussed herein. Many other uses of the present invention will become obvious to one skilled in the art upon acquiring a thorough understanding of the present invention. Once given the below disclosures, many other features, modifications and variations will become apparent to the skilled artisan in view of the teachings set forth herein. Such other features, modifications and variations are, therefore, considered to be a part of this invention.

Figure 1:
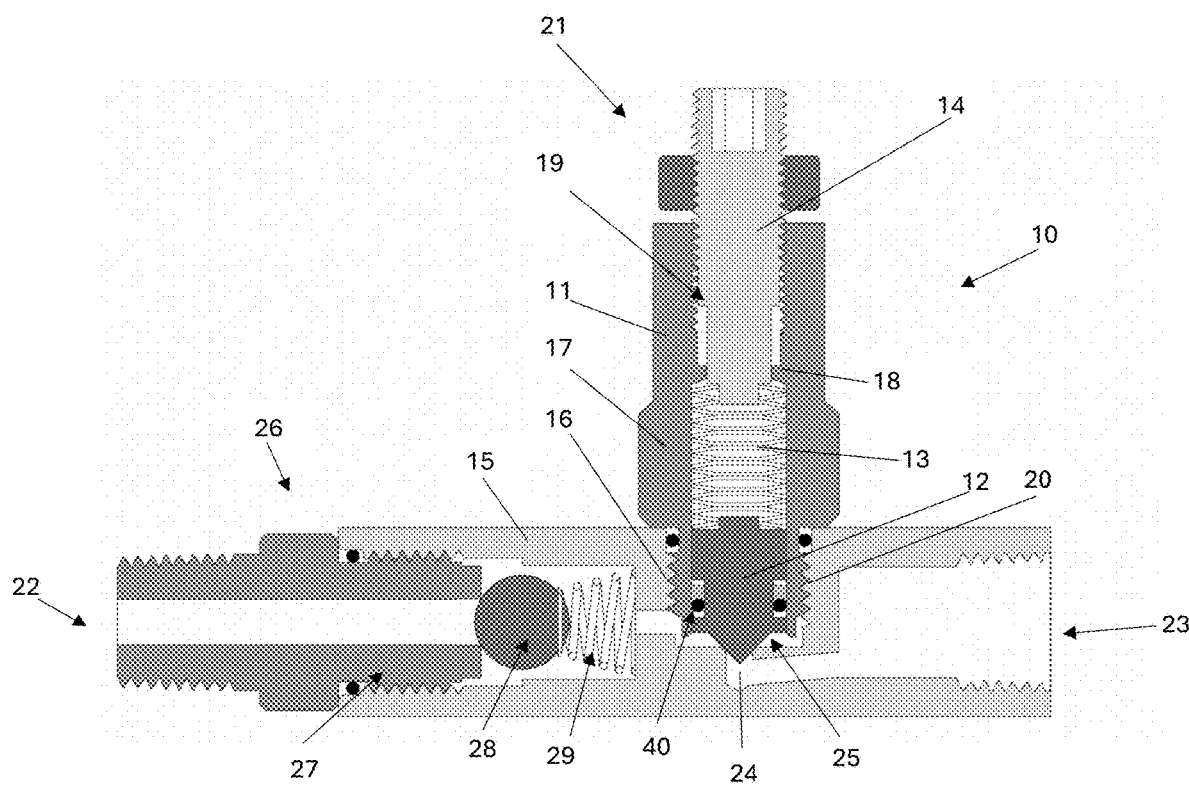
FIG. 1 is an internal side view of a chemical injection optimization and control valve device constructed in accordance with the teachings of the present disclosure.
Figure 2:
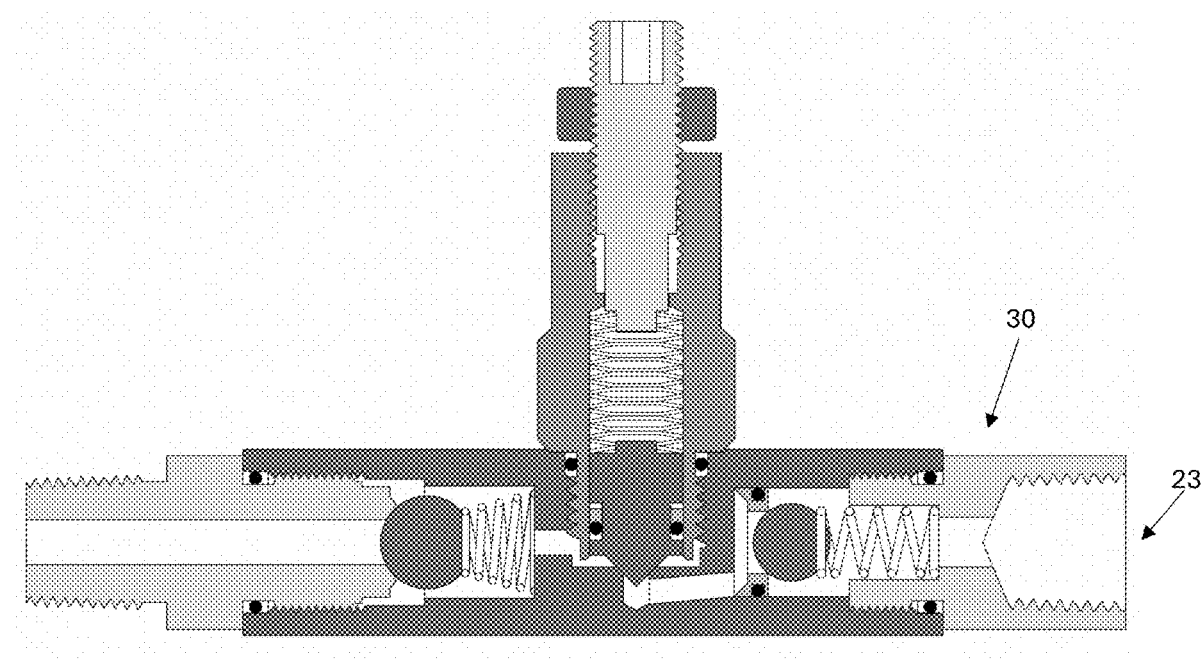
FIG. 2 is a view of an alternative embodiment of a chemical injection optimization and control valve device constructed in accordance with the teachings of the present disclosure.

The device 10 comprises a first tubular housing 11 in which a conical piston 12 travels. The piston 12 is sealed to the interior of the tubular housing by means of a seal 40 that passes around the circumference of the tubing. The piston is kept under tension by a resilient member 13, such as a Bellville spring. The tension is adjustable by a pressure adjustment member 14 located at the opposite end of the tubular housing from the piston conical end. The bottom end 16 of the tubular housing is threaded for insertion into a seat body housing 15. As illustrated in FIGS. 1-2, above the bottom end of the threaded portion of the tubular housing, the tubular housing may include an external protrusion section 17 for cooperative engagement with a fastening tool. The external protrusion 17 may be configured as a polygonal body (such as a hexagonal protrusion), so that the polygonal body is capable of cooperative engagement with a fastening tool, such as a wrench. In other exemplary embodiments, other configurations of external protrusion sections (including non-polygonal surfaces) may be employed. For example, according to exemplary embodiments, the external protrusion section may be configured and adapted for cooperative engagement with other known fastening tools.

The tubular housing 11 further comprises a pressure adjustment stop member 18, as depicted in the attached drawings. Further, the pressure adjustment member 14, which may be defined as a screw or fastener, comprises a projection 19, wherein the projection of the pressure adjustment member prevents the pressure adjustment member from traveling past said pressure adjustment stop member.

The seat body housing 15 comprises a solid machined body that includes a threaded portion 20 at the top to receive the tubular housing 11 and piston assembly 21. The seat body housing 15 further comprises a conical seating surface 25 and threaded portions on a right side and on a left side, one threaded side comprising the inlet port 22 and the other threaded side comprising the discharge port 23. A single horizontal inlet channel passes through the interior of the seat body housing 15 such that the inlet port 22 and the top of the seat body housing 15 are in fluid communication with one another. A single horizontal discharge channel passes through the interior of the seat body housing 15 such that the bottom of the seat body housing and the discharge port 23 are in fluid communication with each other. A single vertical channel 24 extends from the upper portion of the seat body housing 15 through the conical seating surface 25 and intersects the horizontal channel connected to the discharge port 23, such that the upper and lower portions of the seat body housing 15 are in fluid communication with one another, allowing fluid communication between the inlet and discharge ports.

When the tubular housing 11, which contains the conical piston 12, is fastened to the seat body housing 15, the piston sits immediately above and in physical contact with the conical seating surface 25. Specifically, the conical end of the piston is in contact with the seating surface, such that in the ordinary rest position, the piston prevents fluid communication between the inlet and discharge channels (see FIGS. 1-3).

The disclosed invention further includes a check valve 26 positioned in the inlet port 22. The inlet port check valve assembly 26 may comprise a threaded inlet fitting 27, a check ball 28, and spring 29. The check ball is held under tension by the check ball spring against the inlet fitting which contains an integral ball seat. This check valve 26 acts as a further safety device against back flow into the chemical supply source.

Turning to FIG. 2, in another embodiment of the present invention, the discharge port 23 further includes a check valve assembly 30 comprising a check ball seat 41, a check ball, and a spring. The check ball is held under tension by the check ball spring against a ball seat located in the bottom of the discharge port within the seat body housing. The ball seat 41 is sealed to the interior of the seat body housing by means of an o-ring 42 which passes around the circumference of the seat body housing. The ball and spring are contained within the interior of the discharge connection fitting. The bottom of the threaded discharge fitting is in physical contact with the check ball seat thereby retaining the ball seat within the discharge port. This check valve acts as further safety feature against backflow through the device.

Figure 3:
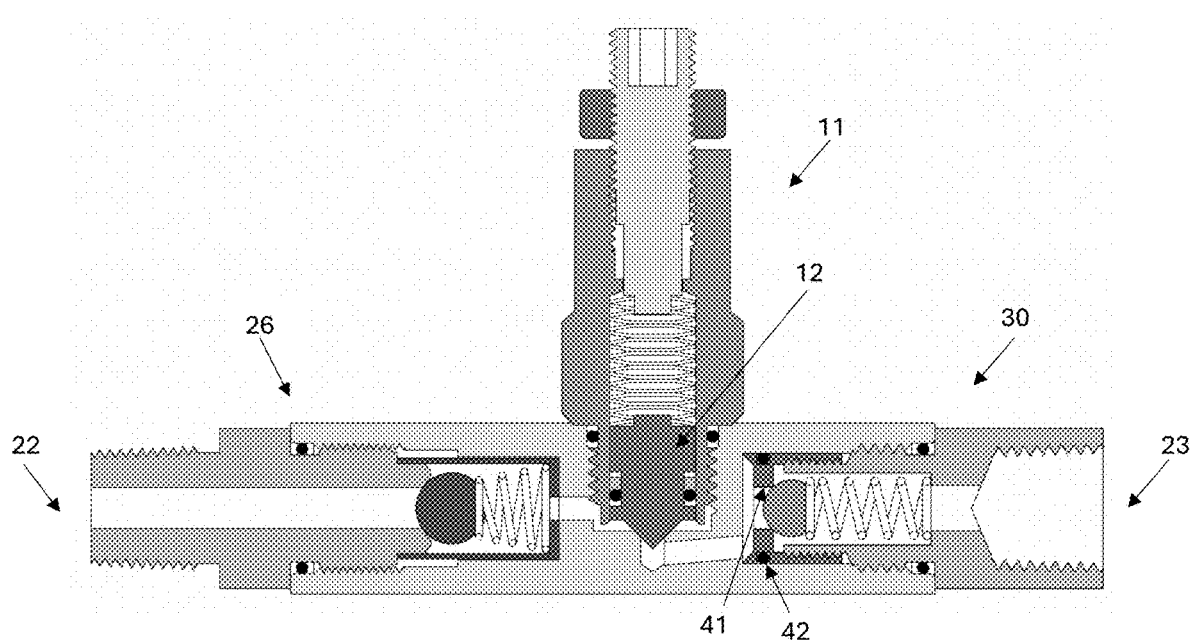
FIG. 3 is a view of an alternative embodiment of a chemical injection optimization and control valve device constructed in accordance with the teachings of the present disclosure. This exemplary device comprises a cartridge option, wherein all three elements are configured in cartridge form such that each cartridge is removable and interchangeable with other cartridges.
Figure 4:
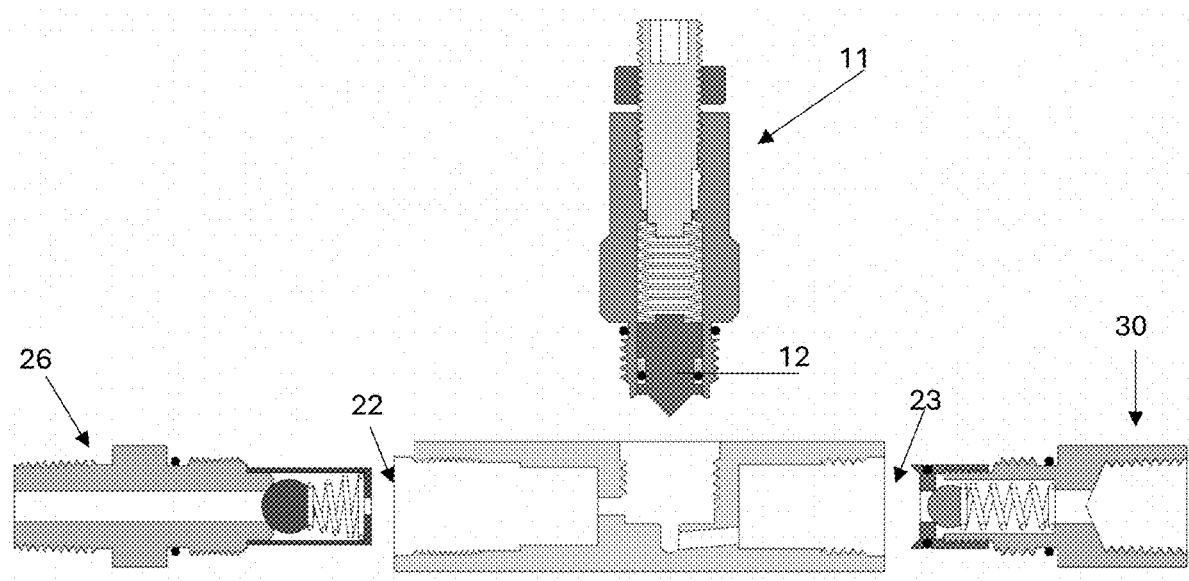
FIG. 4 is a disassembled view of the device shown in FIG. 3. This exemplary device comprises a cartridge option, wherein all three elements are configured in cartridge form such that each cartridge is removable and interchangeable with other cartridges.

FIGS. 3 and 4 depict an alternative embodiment of a chemical injection optimization and control valve device constructed in accordance with the teachings of the present disclosure. This exemplary device comprises a cartridge option, wherein all three elements—the tubular housing 11 in which the conical piston 12 travels, the check valve 26 positioned in the inlet port 22, and the check valve 30 positioned in the discharge port 23—are configured in cartridge form such that each cartridge is removable and interchangeable with other cartridges. FIG. 3 depicts an assembled view of the cartridge option, and FIG. 4 depicts a disassembled view of the cartridge option.

It is important to note that the construction and arrangement of the elements of the invention provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other features, modifications and variations are, therefore, considered to be a part of this invention, the scope of which is to be determined by the following claims.

The invention claimed is:

1. A chemical injection optimization and control valve device for dispensing and optimizing chemical injection processes, comprising:
a first tubular housing in which a conical piston travels, said piston having a seal that passes around a portion of an interior circumference of the first tubular housing;
a resilient member holding said piston under tension;
a pressure adjustment member disposed at the opposite end of said tubular housing from said piston;
an external protrusion section on an external wall of said tubular housing, said external protrusion section being configured for cooperative engagement with a fastening tool;
a pressure adjustment stop member formed on an internal wall of said tubular housing;
a projection formed on said pressure adjustment member, wherein said projection is arranged and configured to prevent said pressure adjustment member from traveling past said pressure adjustment stop member of said tubular housing;
a seat body housing, comprising a seating surface, wherein said seat body housing receives said first tubular housing and wherein said seating surface receives said piston, said seat body housing further comprising an inlet port and a discharge port; and
an inlet port check valve assembly comprising an inlet fitting, a check ball, and a resilient member, wherein said check ball is held under tension by said resilient member against said inlet fitting which comprises an integral ball seat for said check ball;
wherein said seat body housing comprises a single horizontal inlet channel passing through the interior of said seat body housing such that said inlet port and a top portion of said seat body housing are in fluid communication;
wherein a single horizontal discharge channel passes through the interior of said seat body housing such that a bottom portion of the seat body housing and the discharge port are in fluid communication;
wherein a single vertical channel extends from the upper portion of the seat body housing through the seating surface and intersects the horizontal channel connected to the discharge port, such that the upper and lower portions of the seat body housing are in fluid communication with one another, allowing fluid communication between the inlet and discharge ports; and
wherein when the tubular housing, which contains the conical piston, is fastened to the seat body housing, the piston sits immediately above and in physical contact with the conical seating surface such that in a rest position the piston prevents fluid communication between the inlet and discharge channels.

2. The chemical injection optimization and control valve device for dispensing and optimizing chemical injection processes of claim 1, further comprising a discharge port check valve assembly comprising a check ball seat, a check ball, and a spring, wherein said check ball is held under tension by the check ball spring against said ball seat located in the bottom of the discharge port within the seat body housing, and wherein the ball seat is sealed to the interior of the seat body housing by means of an o-ring that passes around the circumference of the seat body housing; wherein the ball and spring are contained within the interior of the discharge connection fitting; and wherein the bottom of the threaded discharge fitting is in physical contact with the check ball seat thereby retaining the ball seat within the discharge port.

3. The chemical injection optimization and control valve device for dispensing and optimizing chemical injection processes of claim 1, wherein the tubular housing in which the conical piston travels, the check valve positioned in the inlet port and the check valve positioned in the discharge port are configured in cartridge form such that each cartridge is removable and interchangeable with other cartridges.

4. A chemical injection optimization and control valve device for dispensing and optimizing chemical injection processes, comprising:
a pressure adjustment member;
a backflow check valve member; and
a seat body housing arranged and configured for receiving a first housing in which a conical piston travels and is adjusted via actuation by said pressure adjustment member, said first housing being attachable and detachable to said seat body housing;
wherein said seat body housing is arranged and configured for receiving an inlet port check valve assembly comprising said backflow check valve member, said inlet port check valve assembly being attachable and detachable to said seat body housing; and
wherein said seat body housing is arranged and configured for receiving a discharge port check valve assembly, said discharge port check valve assembly being attachable and detachable to said seat body housing.

5. The chemical injection optimization and control valve device for dispensing and optimizing chemical injection processes of claim 4, further comprising a resilient member holding said piston under tension.

6. The chemical injection optimization and control valve device for dispensing and optimizing chemical injection processes of claim 5, wherein said first housing receives said pressure adjustment member and said piston, wherein said pressure adjustment member is disposed at the opposite end of said first housing from said piston, and wherein said resilient member is disposed between said pressure adjustment member and said piston within said first housing.

7. The chemical injection optimization and control valve device for dispensing and optimizing chemical injection processes of claim 6, further comprising an external protrusion section on an external wall of said first housing, said external protrusion section being configured for cooperative engagement with a fastening tool.

8. The chemical injection optimization and control valve device for dispensing and optimizing chemical injection processes of claim 7, further comprising a pressure adjustment stop member formed on an internal wall of said first housing, and a projection formed on said pressure adjustment member, wherein said projection is arranged and configured to prevent said pressure adjustment member from traveling past said pressure adjustment stop member of said tubular housing.

9. The chemical injection optimization and control valve device for dispensing and optimizing chemical injection processes of claim 4, wherein said seat body housing comprises an inlet port and a discharge port.

10. The chemical injection optimization and control valve device for dispensing and optimizing chemical injection processes of claim 9, wherein a horizontal discharge channel passes through the interior of said seat body housing, and wherein a vertical channel extends from the upper portion of the seat body housing and intersects said horizontal discharge channel.

11. The chemical injection optimization and control valve device for dispensing and optimizing chemical injection processes of claim 4, wherein said inlet port check valve assembly comprises an inlet fitting, a check ball, and a resilient member, and wherein said check ball is held under tension by said resilient member against said inlet fitting which comprises an integral ball seat for said check ball.

12. The chemical injection optimization and control valve device for dispensing and optimizing chemical injection processes of claim 4, wherein said discharge port check valve assembly comprises a discharge fitting, a check ball seat, a check ball, and a resilient member, and wherein said check ball is held under tension by said resilient member against said check ball seat.

13. The chemical injection optimization and control valve device for dispensing and optimizing chemical injection processes of claim 12, wherein said check ball seat is sealed to the interior of the seat body housing by means of a seal that passes around the circumference of the seat body housing, wherein said check ball and said resilient member are contained within the interior of the discharge fitting, and wherein the bottom of the discharge fitting engages the check ball seat.

14. The chemical injection optimization and control valve device for dispensing and optimizing chemical injection processes of claim 4, wherein said first housing in which said piston travels, said inlet port check valve assembly positioned in the inlet port, and said discharge port check valve assembly positioned in the discharge port, are configured in cartridge form such that each cartridge is removable and interchangeable with other cartridges.

15. The chemical injection optimization and control valve device for dispensing and optimizing chemical injection processes of claim 4, wherein said seat body housing comprises a solid body comprising a threaded portion to receive said first housing, and wherein said seat body housing comprises an inlet port and a discharge port.

16. The chemical injection optimization and control valve device for dispensing and optimizing chemical injection processes of claim 15, further comprising a conical seating surface configured to engage said conical piston.

17. The chemical injection optimization and control valve device for dispensing and optimizing chemical injection processes of claim 16, wherein in a rest position said conical seating surface engages said piston in a manner to prevent fluid communication between said inlet port and said discharge port.

18. The chemical injection optimization and control valve device for dispensing and optimizing chemical injection processes of claim 17, further comprising a vertical channel extending from said seat body housing through said conical seating surface and arranged for fluid communication between said inlet port and said discharge port.

* * * * *